United States Patent [19]

Plumadore

[11] Patent Number: 4,676,626
[45] Date of Patent: Jun. 30, 1987

[54] OPTICAL SYSTEM FOR ELECTROPHOTOGRAPHIC FILM CAMERA/READER-VERIFIER

[75] Inventor: John D. Plumadore, Westfield, Mass.

[73] Assignee: Photon Chroma, Inc., Westfield, Mass.

[21] Appl. No.: 816,528

[22] Filed: Jan. 6, 1986

[51] Int. Cl.$^4$ .................. G03G 15/26; G03G 15/00
[52] U.S. Cl. ........................... 355/5; 355/3 R; 355/40; 355/53; 355/54; 355/64; 355/11
[58] Field of Search ............... 355/3 R, 5, 7, 11, 8, 355/40, 53, 54, 64, 20

[56] References Cited

U.S. PATENT DOCUMENTS

| | | | |
|---|---|---|---|
| 3,951,543 | 4/1976 | Mulligan | 355/5 X |
| 4,286,864 | 9/1981 | Lysle et al. | 355/5 |
| 4,324,484 | 4/1982 | Johnson | 355/5 |
| 4,341,463 | 7/1982 | Kashiwagi et al. | 355/5 X |
| 4,461,566 | 7/1984 | Plumadore | 355/5 X |

*Primary Examiner*—A. C. Prescott
*Attorney, Agent, or Firm*—Schwartz & Weinrieb

[57] ABSTRACT

An optical system for an electrophotographic film camera/reader-verifier. The image is transmitted downwardly to a first mirror (28) fixed at an angle of approximately 45° with respect to either a horizontal or vertical plane. The image is, in turn, transmitted to a second mirror (32) fixedly disposed within a vertical plane, and a focusing lens (36) finally transmits the image to a film element for recording thereon. When an image frame of the film element is to be viewed, read, or verified, a projection lamp (40) is energized for illuminating the film element whereby the illuminated image thereof is transmitted to a third mirror (44), which is located at an inclined angle of approximately 15° with respect to a horizontal plane. The mirror (44) in turn transmits the image of the film element to a front projection screen (46) which is also fixedly disposed at an angle of approximately 15° with respect to a vertical plane. During a reading or verifying mode, the original document is removed from the copyboard (20) whereby viewing of the projection screen (46) is achieved through the clear-glass copyboard (20). The film element is blue light-insensitive, and the projection screen (46) is tinted or colored blue such that an image of the screen (46) is not recorded upon the film during an imaging or recording mode. A blue-colored filter (50) is interposed such that only a blue-colored image of the film element image frame is transmitted to the project screen (46) for maximum contrast.

20 Claims, 1 Drawing Figure

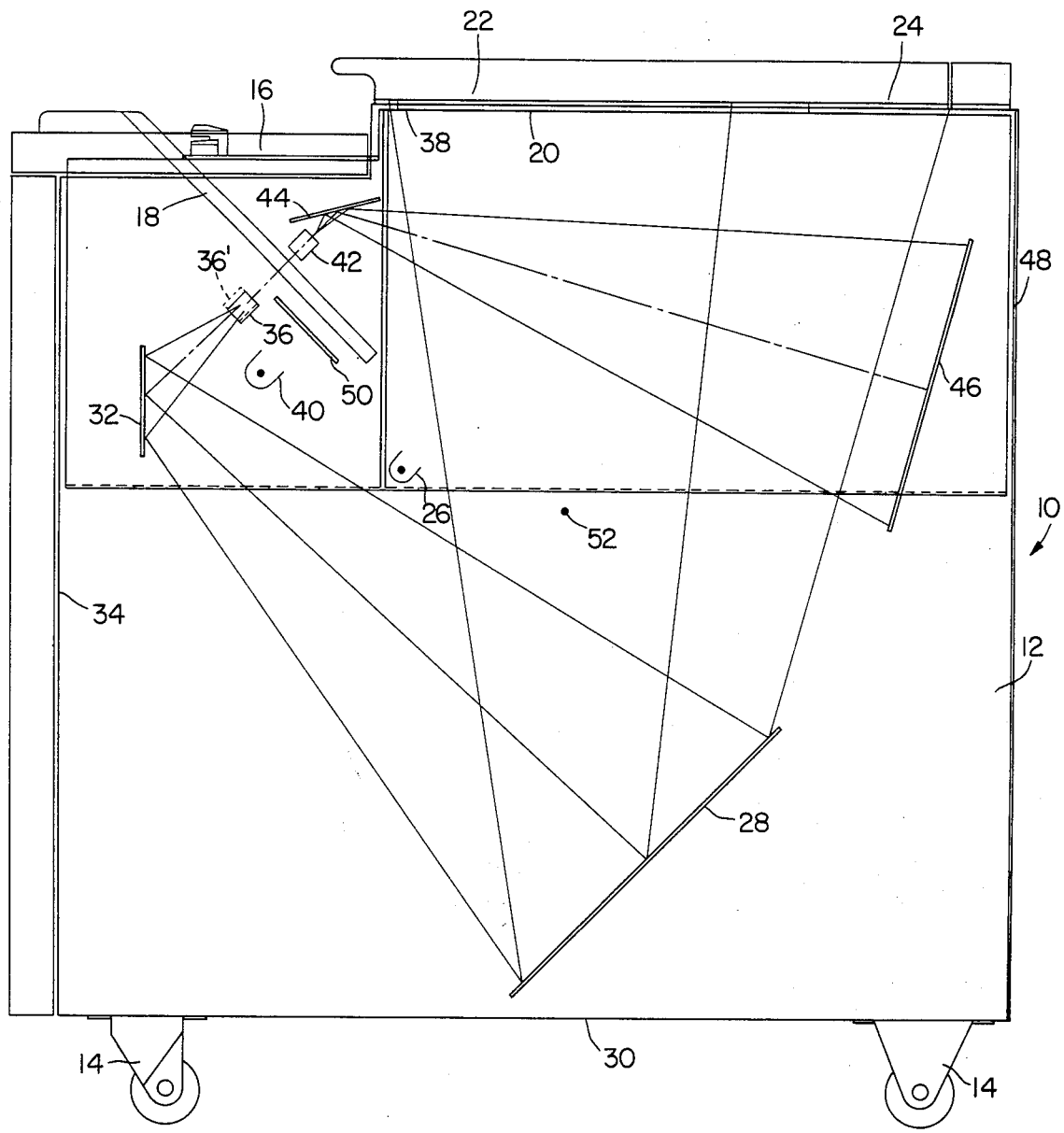

OPTICAL SYSTEM FOR ELECTROPHOTOGRAPHIC FILM CAMERA/READER-VERIFIER

TECHNICAL FIELD

The present invention relates generally to electrophotography, and more particularly to a compact optical system which is uniquely adapted to be employed within a camera/reader-verifier apparatus for fabricating, and subsequently reading-verifying, imaged areas or regions developed upon a microfiche type electrophotographic microfilm element.

BACKGROUND ART

As a result of conventional electrophotographic technology and techniques, there is of course presently available various different devices or apparatus which are capable of imaging and developing, as well as reading, microfilm media. However, the apparatus for performing such diverse functions of imaging-developing and reading are normally separate and distinct from each other. More particularly, one piece or type of apparatus is normally required to serve as the camera/processor for photographing original documents and developing or processing the photographed images so as to form or fabricate the microfilm, while another piece or type of apparatus is additionally required for reading or viewing the developed imaged areas or frames of the microfilm. In fact, as is oftentimes the case, the two different types of apparatus are physically situated at two different locations which may be remotely spaced apart from one another by means of a considerable distance. For example, a particular entity desiring to have particular information, data, or sets of documents recorded and preserved upon microfilm, but only possessing microfilm reader apparatus, may contract with a second entity, possessing camera/processor equipment, to in fact fabricate the microfilm so as to contain the particular information, data, documents, or the like, which the first entity seeks to have recorded and preserved in microfilm format. The fabricated microfilm may of course then be utilized by the first entity within its reader apparatus for reading or review of the recorded microfilm information, data, documents, or the like. Alternatively, a single business entity may possess both types of microfilm apparatus with the different types of apparatus or pieces of equipment located within different departments or buildings of the single entity which may be, for example, a large corporation, a government agency, or the like.

Consequently, it may readily be appreciated that in the first exemplified instance, considerable monetary expenditures will be entailed by means of the first entity in establishing and maintaining its microfilm records in view of the contract fees it will necessarily have to pay the second entity for the fabrication of the microfilm records. In addition, substantial lapses in time will probably occur between the original generation of the original information, data, documents, or the like, the provision or transmission of such to the contracting second entity, and the return of such information, data, documentation, or the like, to the first entity in the completed fabricated microfilm format. Similarly, in connection with the processing of the information, data, documentation, or the like, by means of the single entity in accordance with the second exemplified instance wherein the single entity possesses both types of microfilm apparatus or equipment, considerable monetary expenditures will likewise be necessitated by the requirement of having to purchase one or more pieces or units of each type of microfilm apparatus or equipment, that is, camera/processors and readers/viewers, depending of course upon various different factors, such as, for example, the processing time requirements of the company or agency entity, the number of personnel which will be likely to be utilizing the microfilm apparatus, and the like.

It is therefore seen to be a desirable objective to have microfilm apparatus which is capable of being dual-functional in that a single piece of apparatus or equipment can photograph original information, data, documentation, or the like, and process such images into completed microfilm record media, and subsequently, the same equipment or apparatus can be utilized to view or read such microfilm and the information, data, documentation, or the like, recorded thereon. Dual-functional or dual-mode operational microfilm apparatus per se is already known as exemplified within U.S. Pat. No. 3,612,678 issued to Peter Haslam, Alan G. Kendall, and Anthony LaManna, and assigned to XEROX CORPORATION, however, such apparatus is concerned with the viewing or reading of pre-fabricated microfilm and the reproduction of enlarged photocopies of the microfilm images. Such apparatus is not intended for, or designed to, record original information, data, documentation, or the like, onto a microfilm medium, and/or to subsequently permit review or reading of the microfilm images recorded thereon. Still further, it is readily appreciated that such microfilm reading and reproducing apparatus is, in fact, in simplistic terms, only an accessory piece of equipment being utilized, in effect, in conjunction with conventional photocopying equipment. The latter, in turn, is seen to comprise a large piece of equipment with the microfilm reader section supported upon one end thereof. Consequently, it can be further appreciated that the various processing steps encompassed within the viewing and reproduction functions in conjunction with the microfilm and the imaged areas recorded thereon cannot be conveniently performed by means of a single operator seated, for example, in front of the viewing screen, particularly in view of the fact that the microfilm reader apparatus is of the top-loading type wherein the microfilm must be inserted into the apparatus at the upper end thereof. Loading and unloading of the microfilm medium into and out of the apparatus therefore necessitates the operator to assume a standing position in front of the machine. Likewise, in connection with the reproduction of the microfilm images onto photocopy paper, it is likely that the operator will similarly encounter substantial difficulty in performing all phases of the photo-reproduction process from the aforenoted seated position.

A need has therefore existed in connection with the foregoing type of conventional apparatus for an electrophotographic microfilm dual-functional camera/processor-reader/verifier which is capable of being used either as a camera/processor for imaging and developing information, data, documentation, or the like, onto the microfilm media from original documents placed within the apparatus, or alternatively, as a reader for projecting the imaged cell frames of the microfilm onto a projection screen for viewing by an operator in reviewing the data, information, documentation, or the like, recorded upon the microfilm. Such a dual-functional camera/processor-reader/verifier is disclosed within U.S. Pat. No. 4,286,864 issued to Gordon Lysle and Kenneth R. Baur, and assigned to BELL & HOWELL COMPANY, however, the disclosed system is seen to be quite complex in that there are defined, within the system, essentially two separate and distinct optical systems or paths with a rotatable mirror interposed between the two paths so as to, in effect, determine which path is to be utilized as desired depending upon whether or not an image recording or image cell frame viewing process or mode is to be accomplished. The provision of the two separate and distinct optical systems also renders the entire system or apparatus equipment considerably more expensive than might otherwise be necessitated, and still further, in view of the disposition of the two separate and distinct optical systems upon opposite sides of the microfilm which is located essentially centrally within the apparatus, the entire system or apparatus equipment is quite expansive so as not to be as compact as might otherwise be able to be accomplished as desired.

Accordingly, it is an object of the present invention to provide a new and improved electrophotographic microfilm camera/processor-verifier/reader.

Another object of the present invention is to provide a new and improved electrophotographic microfilm camera/processor-verifier/reader which overcomes the various operational disadvantages characteristic of conventional electrophotographic microfilm camera/processor and reader apparatus or equipment.

Still another object of the present invention is to provide a new and improved electrophotographic microfilm camera/processor-verifier/reader which is dual-functional so as to be capable of alternatively photographing and developing original data, information, documentation, or the like, upon image cell frames of the microfilm, and viewing or reading the same upon a projection screen of the apparatus or equipment.

Yet another object of the present invention is to provide a new and improved electrophotographic microfilm camera/processor-verifier/reader which is capable of accomplishing, within a single piece of apparatus or equipment, the photographing and processing of image cell frames of a microfilm medium encompassing photographic images of original data, information, documentation, and the like, as well as projection screen viewing of the same, by means of a reflective mirror optical system comprising a plurality of fixed or stationary mirror components only, the need for any moving components having been eliminated.

Still yet another object of the present invention is to provide a new and improved electrophotographic microfilm camera/processor-verifier/reader which is capable of accomplishing, within a single piece of apparatus or equipment, the photographing and processing/developing of image cell frames of a microfilm medium encompassing photographic images of original data, information, documentation, or the like, as well as projection screen viewing of the same, by means of a reflective mirror optical system whereby the entire apparatus or equipment is rendered quite compact and is able to be manufactured relatively inexpensively.

Yet still another object of the present invention is to provide a new and improved electrophotographic microfilm camera/processor-verifier/reader which is sufficiently compact so as to render the same small enough to be capable of being operated or serviced by means of a machine operator who can either, as desired, stand in front of the machine or equipment or be seated in front of the machine or equipment, and nevertheless perform all of the necessary functions or operations attendant the photographing and developing of the image cell frames upon the microfilm medium element, as well as the projection screen viewing of the same, without substantially having to alter his or her position relative to the apparatus or equipment.

DISCLOSURE OF THE INVENTION

The foregoing and other objectives of the present invention are achieved in accordance with the various features and cooperative components of the present invention which include a clear-glass copyboard provided within the upper surface of the apparatus and upon which original documents to be imaged and recorded upon the microfilm element are to be disposed within a face-down mode so as to, in effect, define an inverted copyboard. Suitable illumination means is of course provided in order to illuminate the original document disposed upon the copyboard and to be imaged and recorded upon the microfilm element, and a first, fixed mirror, disposed at an angle of 45°, considered with respect to either a vertical or horizontal axis, is disposed within the bottom region of the apparatus housing so as to capture the illuminated image of the original document disposed upon the inverted copyboard. A second, vertically oriented mirror, fixed within the vicinity of the upper front wall region of the apparatus housing, is provided for receiving the image of the original document as transmitted thereto from the first, inclined mirror, and, in turn, for transmitting the image, through means of a suitable focusing lens, to the film element for recording thereon within a particular image frame, the film element being disposed within a plane inclined at an angle of 45° with respect to either a vertical or horizontal plane but in a mode-opposite that of the first inclined mirror so as to be disposed substantially perpendicular thereto.

If it is desired to read or review a document, data, or the like, previously recorded upon a particular image frame of the film element, or to verify the recorded existence of a particular original document, the recording process of which was just immediately completed, the film element is transported to a read or verify station at which a second source of illumination is provided for illuminating the particular image frame of the film element which is desired to be read or verified. The second illumination source is disposed upon the same side of the film element as the imaging/recording focusing lens, and an additional focusing lens is disposed upon the opposite side of the film element for transmitting the illuminated image from the film element to a third mirror fixedly oriented within the upper region of the apparatus housing at an angle of approximately 15° with respect to a horizontal plane. This third mirror, in turn, transmits the projected image of the illuminated film element image frame to a viewing screen disposed within the vicinity of the rear wall of the apparatus housing at an angle of approximately 15° with respect to a vertical plane. In this manner, a front projection viewing system is defined within the apparatus of the present invention whereby in fact the particular image frame of the film element may be read, viewed, or verified upon the projection screen by means of an operator seated in front of the apparatus of the present invention and looking through the clear-glass copyboard provided, of course, the original document, if just previously imaged and recorded upon the film element, has in fact been removed from the copyboard.

In accordance with a particularly unique feature of the present invention, the film element employed within the present invention system is especially fabricated or treated so as to be insensitive to blue light, and in a similar manner, the projection screen is also especially fabricated so as to be blue. As a result of these fabrication techniques, when the original document, located upon the copyboard, is illuminated so as to record an image thereof upon the film element, illumination of the projection screen does not form an image of the screen upon the film element in view of the fact that the film element is blue-light-insensitive. Still further, when an image from the film element is to be projected upon the projection viewing screen, a blue filter is always employed or disposed between the second illumination source, utilized within the reading, viewing, or verifying mode, and the film element such that a blue-filtered projection image is transmitted from the film element to the projection screen. In view of the fact that the projection screen is also blue, which means that it only projects blue light, the contrast developed for viewing the projected image of the film element image frame, containing the particular document, data, or information to be viewed, read, or verified, is maximized. Such contrast is additionally maintained or developed by providing the copyboard with a pivotable cover which is, of course, disposed in its closed or down position during the imaging and recording mode, however, the cover is moved to its open and up position during the reading or verifying mode so as to permit the operator to in fact view the projection screen through the copyboard glass. When disposed in its up and open position, such copyboard cover serves to shield the copyboard and projection screen from ambient room light so as to thereby further enhance the contrast developed for viewing the information, data, and document projected upon the projection viewing screen.

It is to be noted that the aforenoted description of the present invention with respect to the blue light transmission and sensitivity is only provided by way of example. To the contrary, if, for example, a green-insensitive film element was employed within the system of the present invention, then a green-colored projection screen would likewise be employed, as would a green-filter interposed between the second projection lamp and the film element.

BRIEF DESCRIPTION OF THE DRAWINGS

Various other objects, features, and attendant advantages of the present invention will be more fully appreciated when considered in connection with the accompanying drawing, wherein:

The sole FIGURE is a vertical cross-sectional view of the new and improved electrophotographic microfilm camera/processor-verifier/reader constructed in accordance with the present invention and showing the cooperative parts thereof for use in both the camera-imaging/recording and image projection verifying/reading modes.

BEST MODE FOR CARRYING OUT THE INVENTION

Referring now to the sole FIGURE of the drawings, the new and improved electrophotographic microfilm camera/processor-verifier/reader constructed in accordance with the present invention is illustrated within the sole FIGURE and is designated by the reference character 10. The apparatus system of the present invention has its various operative components contained within a substantially cubical housing 12 to the bottom surface of which are mounted caster-type wheel assemblies 14 for rendering the apparatus readily and easily movable or transportable.

The upper, forwardmost surface region of the apparatus housing 12, as shown in the upper left-hand portion of the FIGURE and which would be located directly in front of an operator seated at the apparatus for operating the same, is provided with a control panel 16 by means of which the apparatus, and its various operative imaging or recording, or reading-verifying, modes are initiated and controlled, and within the control panel 16 there is provided or defined slot means 18 within which a microfiche type film element may be inserted and disposed during the various imaging or recording, or reading-verifying modes. The film element mounting slot 18 is disposed at an angle of 45° with respect to either a vertical or horizontal plane so as to extend from an upper-forward position to a lower-rearward position, and means, not shown, are also provided in conjunction therewith for securing the microfiche film element therewithin in a transportable mode such that the film element may be transported, for example, in a generally unidirectional, rectilinear mode between a first charge/exposure station, a second toning station, and a third fusing station, all as more particularly noted within applicant's previously issued U.S. Pat. No. 4,461,561. As noted within applicant's previous patent, the stations are located one image frame apart from each other, and within the apparatus of the present invention as depicted within the sole FIGURE, the film element is therefore adapted to be transported within the plane of the slot means 18 along a directional path extending in and out of the paper containing the sole FIGURE of the drawings.

Disposed immediately rearwardly of the control panel 16 of the apparatus, and upon the upper surface thereof, is a clear-glass copyboard 20 upon which an original document to be imaged and recorded upon the film element, disposed within the film element slot carriage 18, can be positioned for the performance of an imaging and recording process. A cover 22 is pivotably mounted within its rear edge region 24 to the upper rear surface of the apparatus housing 12 so as to be capable of being opened from its illustrated closed position in an upwardly and rearwardly manner. Suitable illumination means, schematically shown for illustration purposes only at 26, is provided within housing 12 for illuminating the original document, not shown, disposed within a face-down or inverted mode upon the copyboard 20, and a first mirror 28 is fixedly disposed within the vicinity of the lower or bottom wall 30 of the housing 12 for capturing the image of the original document disposed upon the copyboard 20 as illuminated by the illumination lamp means 26. The mirror 28 is disposed at an inclined angle of approximately 45° with respect to either a vertical or horizontal plane so as to extend from a lower, forward position to an upper, rearward position, and in this manner, the illuminated image of the original document can be transmitted forwardly and upwardly to a second mirror 32 fixed in a vertically oriented mode within the upper region of the front wall 34 of the apparatus housing 12. A focusing lens 36 is interposed between the second mirror 32 and the film element disposed within the slot carriage 18, and in this manner, the illuminated image of the original document to be recorded upon the film element is transmitted to the film element for recording thereon. As noted previously, hereinabove, the processing format for the electrophotographic film element is such as to dispose the film element at successive or serially arranged charge/exposure, toning, and fusing stations located equidistantly apart by means of a distance dimension equal to the center-to-center distance defined between successive image frames defined upon the film element, as more particularly disclosed within applicant's prior U.S. Pat. No. 4,461,561, and consequently, the focusing lens 36 is disposed at the first charge/exposure station of the processing system. It is to be additionally noted at this juncture, however, that in view of the fact that documents, which are often desired to be imaged and recorded upon a microfilm element, are either of letter-size or legal size, that is, for example, $8\frac{1}{2} \times 11$ inches or $8\frac{1}{2} \times 13$ inches, or still further as is also conventional, in international size dimensioned paper, conventionally known as A3 or A4 paper, the system of the present invention is also provided with a second or auxiliary focusing lens 36' which, for illustration or clarity purposes only, has been shown in dotted lines in the sole FIGURE and out of alignment with primary focusing lens 36 as viewed within a plane parallel to the film slot carriage 18. In actuality, auxiliary focusing lens 36' is disposed directly behind primary focusing lens 36 as viewed in a direction directly perpendicular to the plane of the sole FIGURE so as to, in effect, be disposed at an exposure station which is located at a distance equal to one image frame of the film element upon the side of the primary charge/exposure station, at which the primary focusing lens 36 is located, opposite that side upon which the toning and fusing stations are located relative to the primary charge/exposure station. Accordingly, a processing format utilizing the auxiliary focusing lens 36' would comprise charging of the film element image frame at the primary charge/exposure station, movement of the film element in a first direction to the auxiliary exposure station at which the auxiliary focusing lens 36' is located, and subsequent movement of the film element in the opposite direction through a distance equal to two image frames to the toning station. Fusing of the toned image follows accordingly as a result of movement in the same direction an additional distance of one image frame to the fusing station. The lenses 36 and 36' are of course provided with different focal length properties in order to properly focus the different sized original paper documents, which may be alternatively disposed upon the copyboard 20, onto the film element disposed within the slot carriage 18, and in order to insure the fact that either one of the original, different-sized documents will be properly positioned such that the transmitted images thereof will be properly focussed onto the film element, for imaging and recording thereon, by means of either one of the focusing lenses 36 or 36', the documents will be positioned upon the copyboard 20 in such a manner that the front, right corner of each document, regardless of the size of the particular document, will be aligned with the front right corner of the copyboard 20 as viewed from a plan vantage point, that is, from a position looking downwardly at the copyboard 20. In order to additionally insure that the image of the document to be recorded upon the film element disposed within the slot carriage 18 is properly oriented in a vertical mode, that is, that the record image is right-side-up as opposed to upside down, the top of the document is located at the front edge portion 38 of the copyboard 20. Lastly, in order to properly determine which focusing lens 36 or 36' is going to be employed for transmitting an illuminated image of the original document, disposed upon the copyboard 20, to the film element disposed within slot carriage 18, suitable mask structure, not shown, is properly oriented relative to the lenses 36 and 36', and their respectively focussing or exposure stations, in accordance with corresponding electronic processing initiated by means of processing commands for the imaging and recording of the images upon the film element as entered by means of the operator upon the control panel 16.

Upon completion of an imaging and recording procedure with respect to a particular original document upon a particular image frame of the film element, should it be desired to view the imaged and recorded document upon the film element, suitable commands are entered upon the control panel 16 so as to initiate a read or verify operative cycle. In accordance with such read-verify operative cycle so initiated, suitable electronic controls adopted within the system automatically transports the film element mounted within the slot carriage 18 to a read-verify station which is located, for example, at a distance equal to two image frames downstream in the direction of film imaging or processing from the fusing station such that the last-imaged image frame of the film element is located at the read-verify station. A suitable projection lamp, schematically shown for illustration purposes only as at 40, is provided within the vicinity of the read-verify station and upon the same side of the film element plane, as defined by means of the slot carriage 18, as that of the focusing lenses 36 and 36' for illuminating the particular image frame of the film element disposed at the read-verify station which is desired to be read or verified. A suitable lens 42 is disposed upon the side of the film element, disposed within the slot carriage 18, which is opposite the side, relative to the film element disposed within slot carriage 18, upon which is located projection lamp 40 for transmitting the illuminated image of the illuminated image frame of the film element disposed at the read-verify station to a third mirror 44 which is fixed at an inclined angle of approximately 15° with respect to a horizontal plane so as to extend from a lower, forward position to an upper, rearward position at a location which is disposed beneath the rearward portion of the control panel 16. A projection screen 46 is similarly fixedly disposed within the vicinity of the rear wall 48 of the apparatus housing 12 at an inclined angle of approximately 15° with respect to a vertical plane for receiving the illuminated image of the image frame of the film element as transmitted by means of the third mirror 44, and in this manner, a forward projection system is defined within the apparatus of the present invention. It is to be noted that during a reading-verifying mode, only the projection lamp 40 is energized, while illumination lamp 26 is of course de-energized, and similarly, during an imaging and recording mode, only illumination lamp 26 is energized while projection lamp 40 is simultaneously de-energized. Upon removal of the original document, which was imaged upon the film element, from the copyboard upon completion of the imaging and recording process and upon initiation of the reading-verifying mode, and upon opening of the copyboard cover 22, the operator seated in front of the apparatus can clearly and readily view the projected image of the particular image frame of the film element disposed at the read-verify station upon the projection screen 46 by looking at the screen 46 through the clear-glass copyboard 20. It is to be additionally noted at this juncture that the same viewing or verifying procedure is also to be utilized in the case wherein, in lieu of simply verifying or viewing an image frame upon the film element which was just immediately previously imaged and recorded upon the film element, it is desired to view or read a particular image frame of the film element which was imaged or recorded upon the film element at some time in the past and wherein the film element is simply, at the current time for viewing or reading, loaded into the apparatus within the slot carriage 18. The electronic control circuitry of the apparatus of the present invention may be programmed such that, again, in a manner similar to that previously discussed with respect to the immediately imaged image frame, the transport mechanism of the apparatus transports the film element to the viewing-verifying station such that the last-imaged image frame of the film element is disposed at the read-verify station. Such last-imaged image frame may then of course be viewed or read, or other image frames may be accessed as a result of their relative position with respect to the known last-imaged image frame.

In accordance with a particularly unique feature of the present invention, the film element employed within the system of the present invention is especially fabricated or chemically treated so as to be insensitive to light within the blue region of the color spectrum, and concomitantly or correspondingly, the projection screen 46 of the present invention system is likewise colored blue, that is, painted blue or fabricated from blue anodized aluminum. Still further, a filter medium 50, for transmitting only light within the blue region of the color spectrum, is interposed between the read-verify projection lamp 40 and the film element disposed within the slot carriage 18 so as to transmit only blue light through the film element to the projection screen 46. In this manner, since the projection screen 46 only reflects blue light as a result of being colored blue, and since only blue light is being transmitted to screen 46 by means of the front projection system of the present invention, contrast of the image to be verified or read upon the projection screen 46 is maximized. In addition, it is also noted that the pivotable cover 22 of the apparatus serves to shield the copyboard 20 and the projection screen 46 from ambient overhead light when the cover 22 is raised to its open, elevated position so as to enable viewing of the projection screen 46 through the clear-glass copyboard 20. Consequently, contrast of the projection screen image is enhanced still further.

It is additionally to be noted that since the film element is blue-light insensitive, when the original document disposed upon the copyboard 20 is illuminated by means of the illuminating lamp 26 for an imaging and recording process, since the projection screen 46 only reflects blue-spectrum light, such light, in effect, cannot be "seen" by means of the blue-insensitive film element, and consequently, an image of the projection screen is not recorded upon the film element. Still further, since the film element is blue-light insensitive, the blue light transmitted thereto by means of the projection lamp 40, as determined by means of the blue-colored filter medium 50, will not deleteriously affect the photosensitive properties of the film element. It is also to be noted at this juncture that the relative positions of the projection lamp 40 and the filter medium 50 with respect to the film element and the slot carriage 18, as well as with respect to focusing lenses 36 and 36', are only for illustrative and clarity purposes. As was noted for auxiliary focusing lens 36' with respect to lens 36, the projection lamp 40 and filter medium 50 will actually be axially aligned with respect to transmitting lens 42 at the read-verify station located at a distance equal to two image frames downstream from the fusing station in the direction of processing of the film element image frame, however, if the projection lamp 40 and filter medium 50 were illustrated within the sole FIGURE at the correct axial position with respect to transmitting lens 42, such components would interfere with the illustration of the focusing lenses 36 and 36', so consequently, just for illustrative and clarity purposes, lamp 40 and filter medium 50 have been located at their illustrated positions offset from the axis of transmitting lens 42.

Thus, it may be seen that the apparatus of the present invention comprises a new and improved electrophotographic film camera/reader-verifier which includes an optical system which is uniquely compact, as well as simple to manufacture and operate. In particular, the entire optical system comprises only fixed reflective mirror elements and a front projection screen, the need for any movable optical elements or components having been eliminated, and in addition, it is seen that the compactness of the system resides in the fact that both the imaging or recording, and reading or verifying, optical components of the entire optical system of the apparatus of the present invention are arranged, in effect, within a circular array about an axis illustratively shown, for example, at 52. That is, more particularly, commencing with the angular or arcuate position of the copyboard 20, and ending or terminating with the angular or arcuate position of the projection screen 46, relative to axis 52, and following the natural flowpath of the images during the imaging or recording, and verifying or reading modes, one proceeds from the copyboard 20, which may be considered to be located at an angular position of 0°, continuing to first fixed mirror 28, second fixed mirror 32, and the slot carriage 18 within which the film element is disposed, which defines the imaging or recording mode, and then starting or continuing further from the slot carriage 18 within which the film element is disposed, and continuing to third fixed mirror 44 and projection screen 46, a total arcuate or angular extent of 450° has been traversed relative to axis 52, although it is to be appreciated that such circular path is not within a single plane due to the transverse offset positioning or location of the read-verify station, removed through a distance of several image frames, from the charge/exposure station defined, for example, by means of focusing lens 36, as has more particularly been discussed hereinabove. It is to be noted still further that with the particular optical system of the present invention, correct orientation of the images of the original document, as recorded upon the film element as well as projected upon screen 46, is achieved in a relatively simple manner with a minimum number of optical components, for example, reflecting mirrors, the need for movable optical components has been entirely eliminated and dispensed with which is very desirable as such movable systems are relatively expensive to manufacture, maintain, and service, and still further, the need for any inverting prisms has likewise been able to be obviated.

Obviously, many modifications and variations of the present invention are possible in light of the above teachings. For example, while the aforenoted description referred to the blue-light insensitivity of the film element, and the corresponding use of a blue-colored filter medium 50, as well as coloration of the projection screen 46 as blue, the same precise principles can be applied with other colors, such as, for example, green, red, or the like. It is therefore to be understood that within the scope of the appended claims, the present invention may be practiced otherwise than as specifically described herein.

We claim:

1. An optical system for an electrophotographic film camera/verifier apparatus, comprising:
   means for supporting an electrophotographic film element upon which images are to be recorded and verified;
   copyboard means for supporting an original document the image of which is to be recorded upon said film element;
   first illumination means for illuminating said original document disposed upon said copyboard means during a recording mode;
   second illumination means for illuminating a recorded image frame of said film element during a verifying mode;
   projection screen means for receiving an image of said illuminated image frame of said film element; and
   a plurality of fixed optical components comprising the sole means for transmitting said illuminated image of said original document from said copyboard means to said film element during said recording mode, and for transmitting said illuminated image of said image frame of said film element from said film element to said projection screen means.

2. An optical system as set forth in claim 1, wherein:
   said copyboard means is provided within an upper surface portion of said apparatus; and
   said original document is disposed within a face-down mode,
   whereby said copyboard means defines an inverted copyboard.

3. An optical system as set forth in claim 2, wherein:
   said projection screen means is disposed within a rear section of said apparatus so as to be visible through said copyboard means.

4. An optical system as set forth in claim 1, wherein said optical components comprise:
   a pair of mirrors interposed between said copyboard means and said film element for transmitting said illuminated image of said original document to said film element; and
   a single mirror interposed between said film element and said projection screen means for transmitting said illuminated image frame of said film element from said film element to said projection screen means.

5. An optical system as set forth in claim 4, wherein:
   a first one of said pair of mirrors is disposed within the bottom region of said apparatus at an angle of 45° with respect to a horizontal plane; and
   a second one of said pair of mirrors is disposed within a vertical plane within a front wall region of said apparatus.

6. An optical system as set forth in claim 4, wherein:
   said single mirror is disposed within an upper region of said apparatus at an angle of 15° with respect to a horizontal plane; and
   said projection screen means is disposed within a rear section of said apparatus at an angle of 15° with respect to a vertical plane.

7. An optical system as set forth in claim 1, wherein:
   said film element is insensitive to light within a particular region of the color spectrum; and
   said projection screen means is colored a color corresponding to said particular region of said color spectrum to which said film element is insensitive so that an image of said projection screen means will not be recorded upon said film element when said original document is illuminated by said first illumination means.

8. An optical system as set forth in claim 1, additionally comprising:
   filter means interposed between said second illumination means and said film element for transmitting only light with a particular region of the color spectrum; and
   said projection screen means is colored a color corresponding to said particular region of said color spectrum characteristic of said light transmitted to said film element by said second illumination means, and as determined by said filter means, whereby the contrast of said image of said image frame of said film element projected upon said projection screen means is maximized.

9. An optical system as set forth in claim 1, further comprising:
   cover means pivotably secured to said apparatus for covering and uncovering said copyboard means.

10. An optical system as set forth in claim 1, wherein:
    said means for supporting said film element comprises a carriage inclined at an angle of 45° with respect to a horizontal plane.

11. An optical system as set forth in claim 1, wherein:
    said copyboard means, said optical components, said film element, and said projection screen means are disposed within a circular array about an axis extending through said apparatus wherein said circular array defines an arcuate extent of approximately 450°.

12. An optical system for an electrophotographic film camera/verifier apparatus, comprising:
    means for supporting an electrophotographic film element upon which images are to be recorded and verified;
    copyboard means for supporting an original document the image of which is to be recorded upon said film element;
    first illumination means for illuminating said original document disposed upon said copyboard means during a recording mode;
    second illumination means for illuminating a recorded image frame of said film element during a verifying mode;
    projection screen means for receiving an image of said illuminated image frame of said film element; and
    a plurality of fixed optical components, interposed between and defining with said copyboard means and said projection screen means a circular array about an axis extending transversely through said apparatus, comprising the sole means for transmitting said illuminated image of said original document from said copyboard means to said film element during said recording mode, and for transmitting said illuminated image of said image frame of said film element from said film element to said projection screen means.

13. An optical system as set forth in claim 12, wherein:
said copyboard means is provided within an upper surface portion of said apparatus; and
said original document is disposed upon said copyboard means in a face-down mode such that said copyboard means defines an inverted copyboard.

14. An optical system as set forth in claim 13, wherein:
said projection screen means is disposed within a rear section of said apparatus so as to be visible through said copyboard means.

15. An optical system as set forth in claim 12, wherein said optical components comprise:
a pair of mirrors interposed between said copyboard means and said film element for transmitting said illuminated image of said original document to said film element; and
a single mirror interposed between said film element and said projection screen means for transmitting said illuminated image frame of said film element from said film element to said projection screen means.

16. An optical system as set forth in claim 15, wherein:
a first one of said pair of mirrors is disposed within the bottom region of said apparatus at an angle of 45° with respect to a horizontal plane; and
a second one of said pair of mirrors is disposed within a vertical plane within a front wall region of said apparatus.

17. An optical system as set forth in claim 15, wherein:
said single mirror is disposed within an upper region of said apparatus at an angle of 15° with respect to a horizontal plane; and
said projection screen means is disposed within a rear section of said apparatus at an angle of 15° with respect to a vertical plane.

18. An optical system as set forth in claim 12, wherein:
said film element is insensitive to light within a particular region of the color spectrum;
filter means are interposed between said second illumination means and said film element for transmitting light only within said particular region of said color spectrum; and
said projection screen means is colored a color corresponding to said particular region of said color spectrum so that an image of said projection screen means will not be recorded upon said film element during said recording mode, and the contrast of said image of said image frame of said film element projected upon said projection screen means is maximized.

19. An optical system as set forth in claim 12, wherein:
said means for supporting said film element comprises a carriage inclined at an angle of 45° with respect to a horizontal plane.

20. An optical system for an electrophotographic film camera/verifier apparatus, comprising:
means for supporting an electrophotographic film element upon which images are to be recorded and from which said recorded images are to be verified;
inverted copyboard means defined within an upper surface of said apparatus for supporting an original document in a face-down mode, the image of which is to be recorded upon said film element;
first illumination means for illuminating said original document disposed upon said copyboard means during a recording mode;
second illumination means for illuminating a recorded image frame of said film element during a verifying mode;
projection screen means, disposed within a rear section of said apparatus and visible through said copyboard means, for receiving an image of said illuminated image frame of said film element; and
a plurality of fixed optical components comprising the sole means for transmitting said illuminated image of said original document from said inverted copyboard means to said film element during said recording mode, and for transmitting said illuminated image of said image frame of said film element from said film element to said projection screen means.

* * * * *